US007945596B2

(12) United States Patent
Anonsen et al.

(10) Patent No.: US 7,945,596 B2
(45) Date of Patent: May 17, 2011

(54) PROGRAMMING MODEL FOR CUSTOMIZED DATA OBJECTS

(75) Inventors: Steven P. Anonsen, Fargo, ND (US); Adrian L. Orth, West Fargo, ND (US); Daniel Edward Seefeldt, West Fargo, ND (US); Steven V. Harter, Fargo, ND (US); Timothy J. Brookins, West Fargo, ND (US); Patrick E. Plaisted, Rawson, OH (US)

(73) Assignee: Microsoft Corproation, Redmond, WA (US)

( * ) Notice: Subject to any disclaimer, the term of this patent is extended or adjusted under 35 U.S.C. 154(b) by 354 days.

(21) Appl. No.: 11/472,050

(22) Filed: Jun. 20, 2006

(65) Prior Publication Data

US 2008/0005140 A1 Jan. 3, 2008

(51) Int. Cl.
*G06F 7/00* (2006.01)

(52) U.S. Cl. ...................................... 707/803
(58) Field of Classification Search .................. None
See application file for complete search history.

(56) References Cited

U.S. PATENT DOCUMENTS

| | | | |
|---|---|---|---|
| 5,297,279 A | 3/1994 | Bannon et al. | |
| 5,499,371 A | 3/1996 | Henninger et al. | |
| 5,542,078 A | 7/1996 | Martel et al. | |
| 5,774,725 A | 6/1998 | Yadav et al. | |
| 5,794,041 A | 8/1998 | Law et al. | |
| 5,838,965 A | 11/1998 | Kavanagh et al. | |
| 6,067,525 A | 5/2000 | Johnson et al. | |
| 6,175,837 B1 | 1/2001 | Sharma et al. | 707/103 |
| 6,226,692 B1 | 5/2001 | Miloushev et al. | |
| 6,275,977 B1 | 8/2001 | Nagai et al. | |
| 6,289,380 B1 | 9/2001 | Battat et al. | |
| 6,308,168 B1 | 10/2001 | Dovich et al. | |
| 6,539,374 B2 | 3/2003 | Jung | |
| 6,567,846 B1 | 5/2003 | Garg et al. | 709/218 |
| 6,658,633 B2 | 12/2003 | Devins et al. | |
| 6,694,316 B1 | 2/2004 | Langseth et al. | |
| 6,708,166 B1 | 3/2004 | Dysart et al. | 707/6 |
| 6,941,316 B2 | 9/2005 | Venkatesh et al. | 707/101 |
| 6,950,802 B1 | 9/2005 | Barnes et al. | |

(Continued)

FOREIGN PATENT DOCUMENTS

WO  WO 02/35351 A1  5/2002

(Continued)

OTHER PUBLICATIONS

Foote, B., et al., "Metada and active object-models," *University of Illinoise at Urbana-Champaign*, 1998, http://www.joeyoder.com/papers/patterns/Medadata/metadata.pdf, downloaded from the Internet on or about Apr. 6, 2006, 1-23.

(Continued)

*Primary Examiner* — Don Wong
*Assistant Examiner* — Belinda Xue
(74) *Attorney, Agent, or Firm* — Woodcock Washburn LLP (57) ABSTRACT

A programming model for customized data objects is provided. For several embodiments, a method for providing customizable data objects comprises storing an abstract definition of an entity in metadata, the definition including a set of properties of the entity; and generating an entity view class based on the set of properties of the entity and including at least one property of the entity in the entity view. When programming against the entity view class, only those properties included in the entity view class are allowed to be seen or modified.

20 Claims, 9 Drawing Sheets

U.S. PATENT DOCUMENTS

| | | | |
|---|---|---|---|
| 6,959,268 B1 | 10/2005 | Myers, Jr. et al. | |
| 6,985,905 B2 | 1/2006 | Prompt et al. | 707/102 |
| 6,988,109 B2 | 1/2006 | Stanley et al. | 707/103 Y |
| 7,089,530 B1 | 8/2006 | Dardinski et al. | |
| 7,599,948 B2 * | 10/2009 | Thompson et al. | 707/101 |
| 2002/0091990 A1 * | 7/2002 | Little et al. | 717/105 |
| 2002/0104069 A1 | 8/2002 | Gouge et al. | 717/107 |
| 2003/0023413 A1 | 1/2003 | Srinivasa | |
| 2003/0098887 A1 | 5/2003 | Li | |
| 2003/0126181 A1 | 7/2003 | Young | |
| 2003/0187706 A1 | 10/2003 | Buchmiller et al. | |
| 2004/0117355 A1 * | 6/2004 | Lef et al. | 707/3 |
| 2004/0168153 A1 | 8/2004 | Marvin | |
| 2004/0181291 A1 | 9/2004 | Plaisted et al. | 700/1 |
| 2004/0181418 A1 | 9/2004 | Petersen et al. | 705/1 |
| 2004/0181534 A1 | 9/2004 | Mortensen et al. | 707/100 |
| 2005/0131970 A1 | 6/2005 | Salazar et al. | 707/205 |
| 2005/0154699 A1 * | 7/2005 | Lipkin et al. | 707/1 |
| 2005/0166193 A1 | 7/2005 | Smith et al. | |
| 2005/0262475 A1 | 11/2005 | Halpern | 717/114 |
| 2007/0011192 A1 * | 1/2007 | Barton | 707/103 R |

FOREIGN PATENT DOCUMENTS

| | | |
|---|---|---|
| WO | WO 02/39255 A2 | 5/2002 |
| WO | WO 03/042821 | 5/2003 |

OTHER PUBLICATIONS

Lédeczi, A., et al., "Composing domain-specific design environments," *IEEE*, 2001, 44-51.

Yoder, J.W., et al., "Architecture and design of adaptive object-models," *ACM SIGPLAN Notices*, 2001, 36(12), 50-60.

Florijn et al., "Tool support for object-oriented patterns", Utrecht University, Proceedings of ECOOP 1997, 472-495.

Japanese application No. 2004-069828: Notice of Rejection dated May 18, 2010.

Japanese application No. 2004-069828: Notice of Rejection dated Sep. 10, 2010.

Ramakrishnan, Database Management Systems, The McGraw-Hill Companies, Inc., 1998, 11-13.

* cited by examiner

PROGRAMMING MODEL FOR CUSTOMIZED DATA OBJECTS

CROSS REFERENCE TO RELATED APPLICATIONS

The present invention is related to the following commonly assigned U.S. patent applications, the entirety of which are hereby incorporated by reference: U.S. patent application Ser. No. 11/046,127, filed Mar. 7, 2003 entitled "Customization of Fields in Objects in a Computing Environment," U.S. patent application Ser. No. 10/389,685, filed Mar. 12, 2003 entitled "Parameterized and Reusable Implementations of Business Logic Patterns," U.S. patent application Ser. No. 10/387,508, filed Mar. 12, 2006 entitled "Customization of Metadata Describing Objects in a Computing Environment," and U.S. patent application Ser. No. 11/046,127, filed Jan. 28, 2005 entitled "System and Methods for Capturing Structure of Data Models Using Entity Patterns."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Commercial line-of-business applications are commonly customized as part of their deployment to fit them to the needs of that particular business. Additional third-party software is also employed to handle particular processes.

A common customization is to add new data fields to existing tables. Developers accessing that data are typically provided an application programming interface (API) with classes to represent each abstract entity in the application. For example, an application may have a Vendor class with several properties representing its name, address and other relevant information. Such an API provides conveniences to the developer such as allowing the display of the properties with a class viewer, allowing the compiler to verify that accessed data elements are present (rather than discovering such issues when the application is run) and simplifying the authoring of logic against the data.

Many commercial applications vendors publish the source code for their applications, enabling customizing developers to modify the source to add fields and accompanying business logic. This has the disadvantage that new releases of the software often have changes that are made to the same area of the code that the customizer modified. Installing the new release requires reapplying the changes, a real issue for customers and customizers alike.

Another issue is that developers are required to use the classes produced for them by the original application developer. While such classes are often helpful, often they are not. Different developers typically need to use data in different scenarios, and the class provided by the application developer may not be optimized for that scenario. Consider two developers who are working with Order data in very different ways. The first developer is writing an order creation form that must validate all data entered so that the order can be processed without delay. The second developer is writing an application that talks to the business system through a web service and requests that it create an order. The Order class used to implement the data entry form isn't a good fit for the web service scenario because it is (1) interactive rather than batch, (2) provides more validation than is needed in that case (as the order will need to be verified later anyway) and (3) exposes internal policy to web service users. Exposing internal policy is problematic both because it may reveal operational details about the company and because policies may change.

A third issue that both the customizer and the original application developer face is the need to interact with more of the application data than is strictly necessary for the functionality they're producing. This is negative in a more subtle way, because it introduces unnecessary coupling between two parts of the application and makes it difficult to know if a dependency on a particular data element is actually present. Such unnecessary coupling has proven to make an application more complex, which makes maintenance more complicated over time.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, a programming model for customized data objects is provided. For several embodiments, a method for providing customizable data objects comprises storing an abstract definition of an entity in metadata (the definition including a set of properties of the entity) and generating code for an entity view class based on the set of properties of the entity and including at least one property of the entity in the entity view. When programming against the entity view class, only those properties included in the entity view class are allowed to be seen or modified.

Also, for several embodiments, a system for using customizable data objects comprises a first module that communicates with an entity view class generated based on a set of properties of an entity (the entity view class including at least one property of the entity), a second module that enables programming against the entity view class, but allows only those properties included in the entity view class to be seen or modified, and an entity data buffer containing data associated with the set of properties of the entity upon which the first and second modules rely to obtain data associated with the set of properties of the entity.

Other advantages and features of the invention are described below.

BRIEF DESCRIPTION OF THE DRAWINGS

A programming model for customized data objects is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

EXAMPLE COMPUTING ENVIRONMENTS

Figure 1:
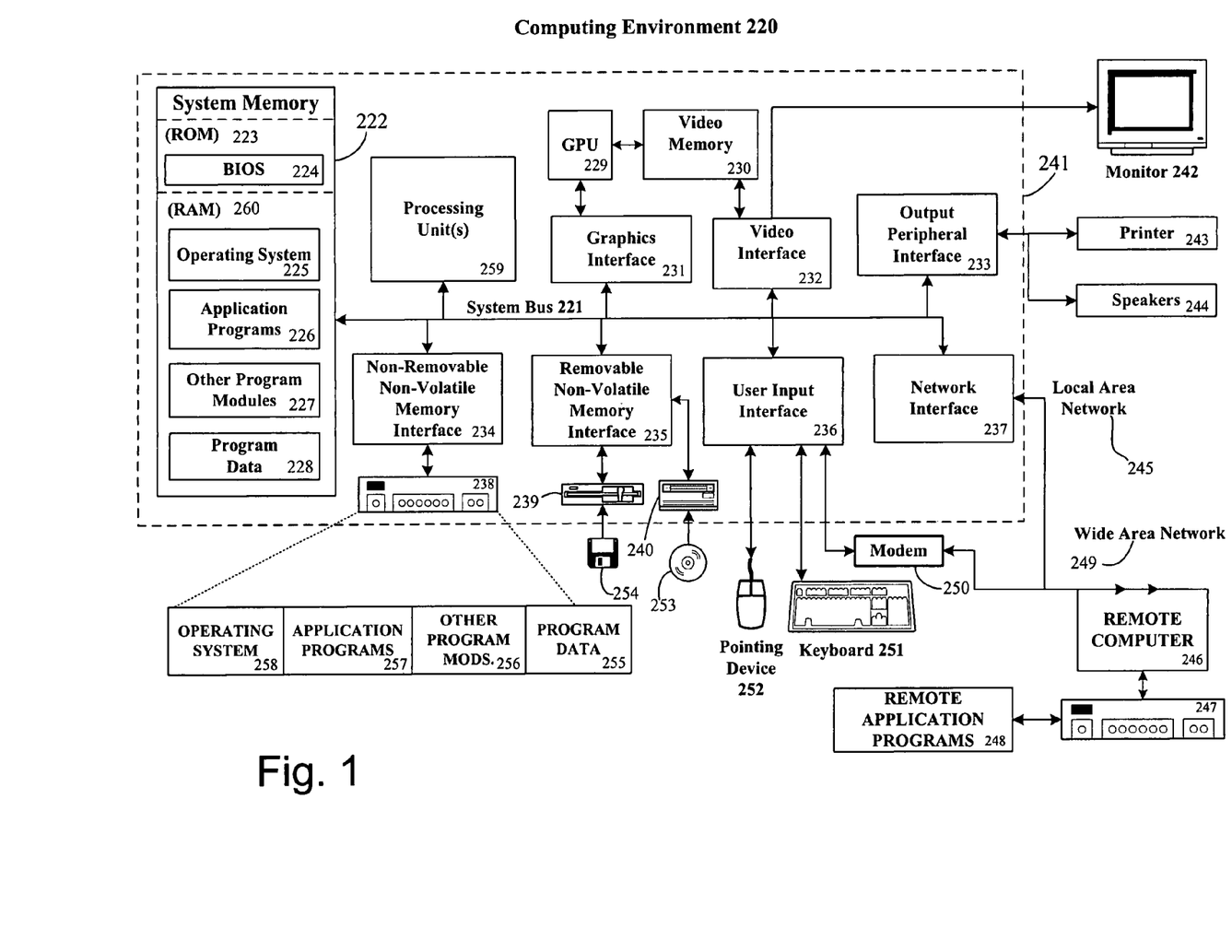
FIG. 1 is a block diagram representing an exemplary computing device suitable for use in conjunction with a programming model for customized data objects.

Referring to FIG. 1, shown is a block diagram representing an exemplary computing device suitable for use in conjunction with implementing the processes described above. For example, the computer executable instructions that carry out the processes and methods for providing a programming model for customized data objects may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a-mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
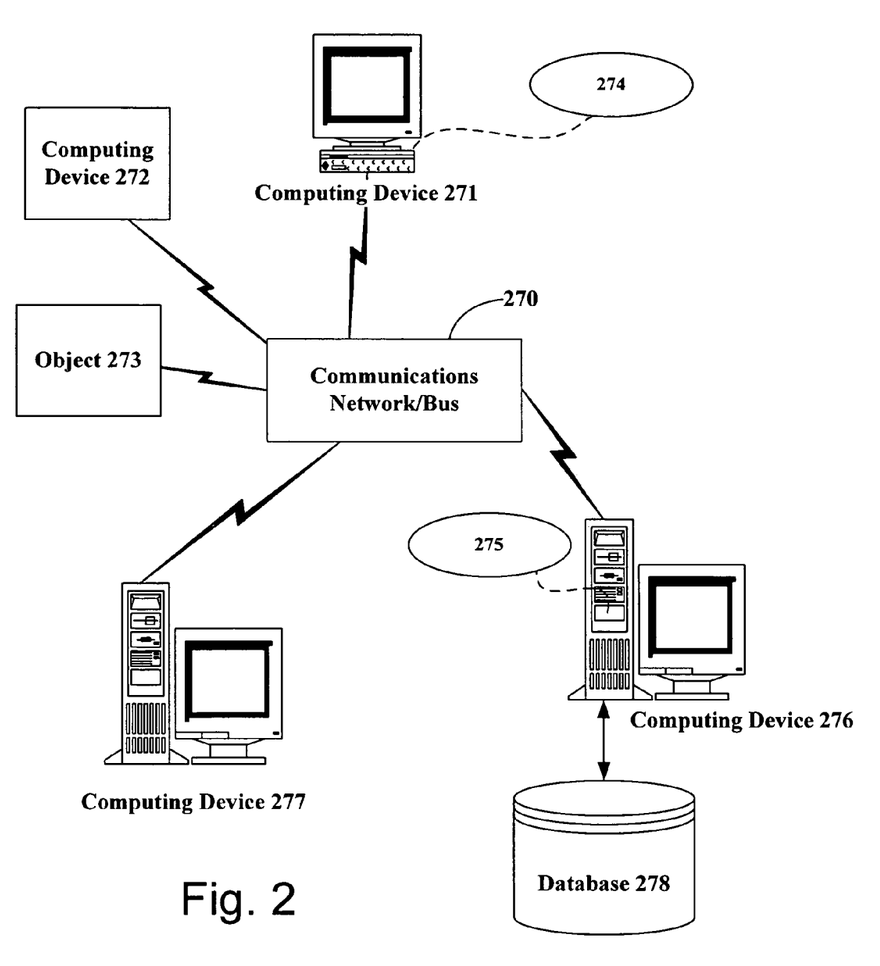
FIG. 2 illustrates an exemplary networked computing environment in which many computerized processes may be implemented to provide a programming model for customized data objects.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing a programming model for customized data objects. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Programming Model

Figure 3:
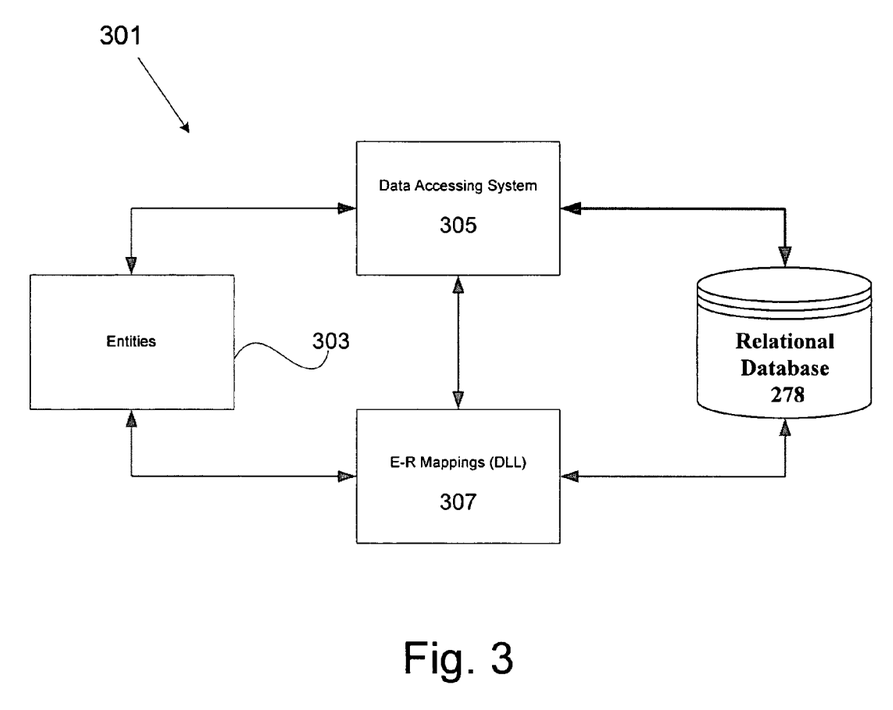
FIG. 3 is a block diagram illustrating an object-relational (or entity-relational) database system.

Referring next to FIG. 3, shown is a block diagram illustrating an object-relational (or entity-relational) database system. In the present discussion, entities will be referred to in a manner that is interchangeable with the term "objects". E-R system 301 includes a set of entities (or objects) 303 which correspond to data stored in a relational database 278. The compiled types and the metadata definitions for the entities are stored in dynamic link libraies (DLLs)—assemblies to be more specific. But the entities themselves, the instances of those types that are described by that metadata, they are not stored in DLLs. The entities 303 access relational data through data accessing system 305 which utilizes entity-relational (ER) map 307, for example. ER map 307 contains a mapping between the entities 303 and the table entries in relational database 278. It should be noted a programming model for customized data objects can be used in other systems, other than E-R systems, and the system shown in FIG. 3 is but one example of a system in which a programming model for customized data objects can be used. In fact, mapping does not be necessarily supported in the programming model for customized data objects.

Figure 4:
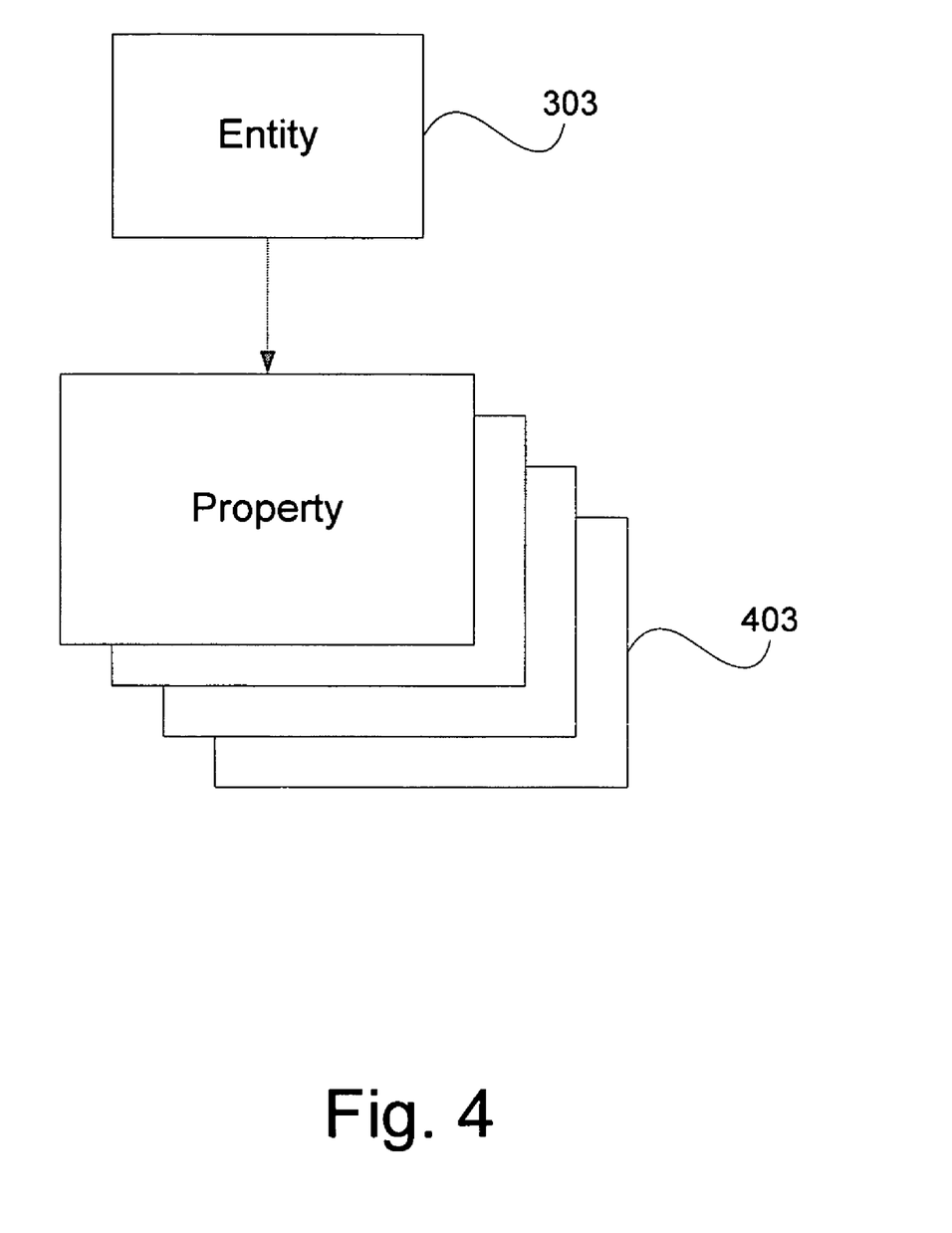
FIG. 4 is a block diagram illustrating an example relationship between an entity and its properties.

Referring next to FIG. 4, shown is a block diagram illustrating an example relationship between an entity and properties. An entity 303 may have a number of properties 403 associated with it. For example, a customer entity may have one or more specific properties associated with it such as customer name, etc. This example is illustrated further below in conjunction with FIG. 5.

Figure 5:
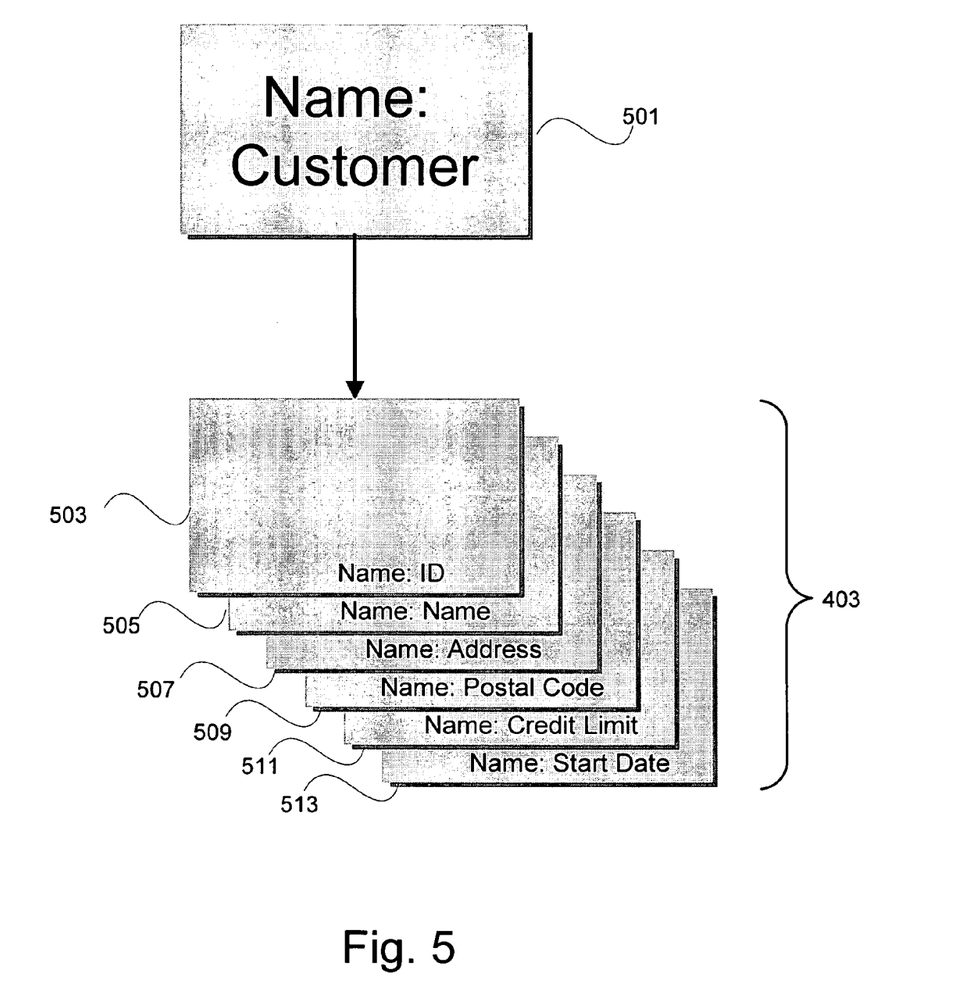
FIG. 5 is a block diagram illustrating an example relationship between a specific example entity and specific example properties.

Referring next to FIG. 5, shown is a block diagram illustrating an example relationship between a specific example entity and specific example properties. Shown is the entity customer 501 with specific properties associated with that entity. These include (for the present example): ID 503, Name 505, Address 507, Postal Code 509, Credit Limit 511, and Start Date 513.

Figure 6:
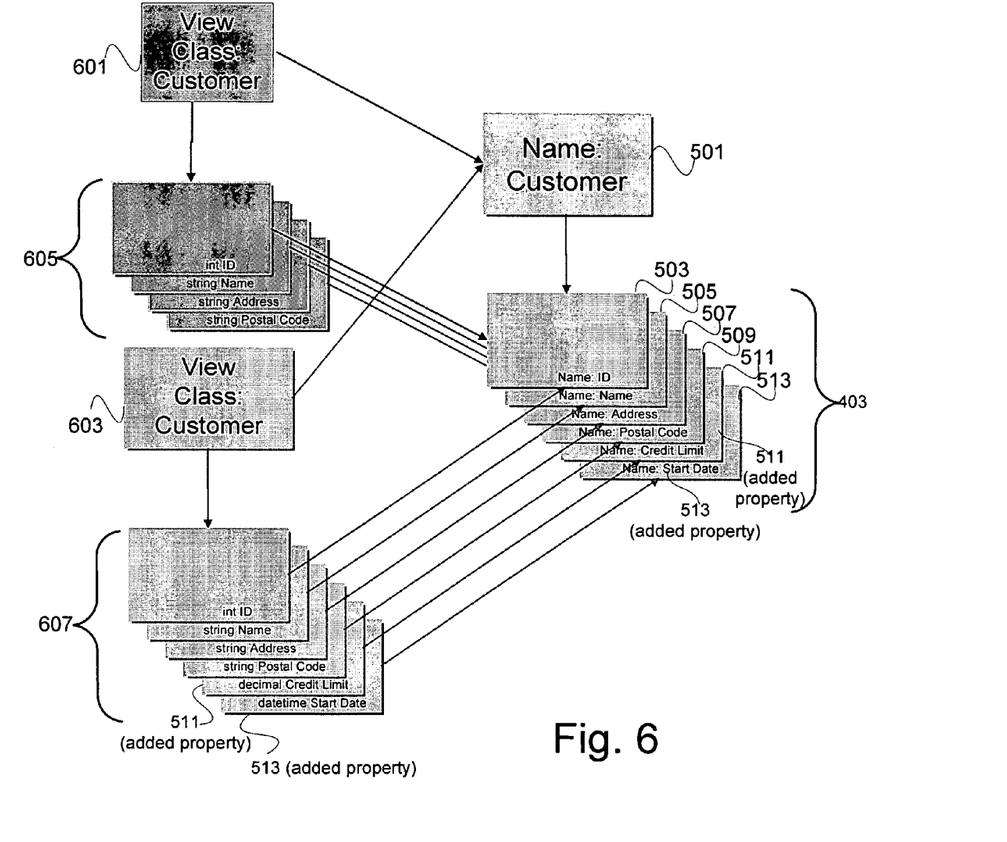
FIG. 6 is a block diagram illustrating example entity view classes over the set of example properties of FIG. 5.

Referring next to FIG. 6, shown is a block diagram illustrating example entity view classes over the set of example properties of FIG. 5. Shown is an example of a framework that provides different example view classes 601 and 603 over the same entity 501 of FIG. 5 to meet different scenarios. Also, use may infer the Entity View Class 601, 603 properties from the Entity model instead of them being explicitly modeled. The present example describes creating view classes using the Common Language Runtime (CLR). CLR is the core runtime engine in the Microsoft.NET® Framework for executing applications. The CLR supplies managed code with services such as cross-language integration, code access security, object lifetime management, resource management, type safety, pre-emptive threading, metadata services (type reflection), and debugging and profiling support. However, the programming model systems and methods described herein are equally applicable to other software environments and runtime engines such as those provided by Sun Microsystems Java®, etc.

The original entity 501 definition is provided in metadata. Customizers can add additional properties to the original entity definition (or to a customized entity definition that had other properties already added to it). Any developer can add additional properties to an entity 501. For example, the properties Start Date 511 and Credit Limit 513 may have been added later by a customizer or developer to the original entity 501 definition.

When a developer wants to have a CLR class to use for programming against the entity data 403, they can generate one with just the properties of interest to them in their scenario. Such a class is called an entity view class. Properties added to the entity after they generated their entity view class won't be seen. Each developer may choose to use an entity view class that matches the original definition of the entity 501, or they may create a custom entity view class. The system treats either entity view class identically. For example, the entity view class 603 matches the new definition of the entity 501. Included in the entity view class 603 are all the properties 607 of the new definition of the entity 501. These include: ID 503, Name 505, Address 507, Postal Code 509, Credit Limit 511, and Start Date 513. However, the original entity view class 601 includes a subset 605 of those properties 403 of the new definition of the entity 501. These include: ID 503, Name 505, Address 507, Postal Code 509.

When programming against an entity view class, the framework loads all of the data 403 for the entity 501, but only those properties present in the entity view class 601, 603 can be seen or modified by it. The API allows easily switching between these different views. Alternatively, instead of using an entity view class, the developer can use a weakly-typed application programming interface (API) where all properties can be seen, but they will not have the benefit of IntelliSense®, compile time checking and so forth. IntelliSense® is a feature introduced by the Microsoft® Visual Studio Integrated Development Environment (IDE). It involves a form of autocomplete for variable names, functions and member functions (for classes in C# and other programming languages). However, it may also be applied to other programming languages, and while it is for class properties in the present scenario, it isn't limited to classes. An application programming interface (API) that is weakly typed doesn't verify that entity properties exist until runtime, while a strongly typed API verifies the presence of entity properties at compile time.

Figure 7:
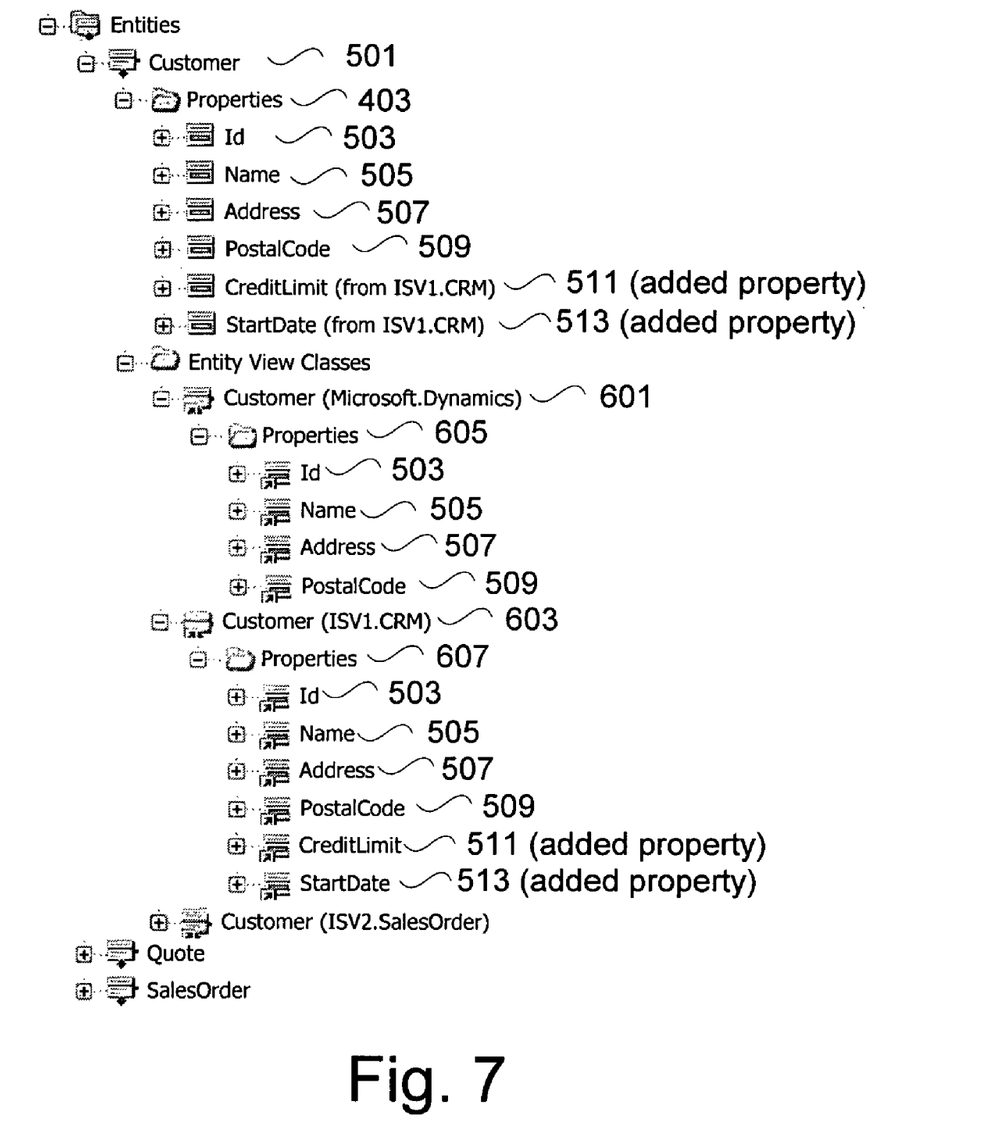
FIG. 7 is an example software tool user interface detailing the structure of the example entity view classes over the set of example properties of FIG. 5.

Referring next to FIG. 7, shown is an example software tool user interface detailing the structure of the example entity view classes over the set of example properties of FIG. 5. In the example shown in FIG. 7, the properties Credit Limit 511, and Start Date 513 are not initially part of the original definition of the entity 501, but the properties are added a by customization and then used with custom view class 603, for example. As shown, all of the entity view classes (including custom entity view classes 601, 603) are shown under the original definition of the entity 501 and can be expanded to show the properties 605, 607 included within each view class 601, 603.

Underlying an instance of an entity view class 601, 603 is an entity data buffer 901 (shown in FIG. 9) that contains the data for all of the currently defined properties 403 on the entity 501. To make the distinction between type and instance clear, an instance of an entity definition is present at runtime and different view classes can be used to look at it. An instance of more than one view class 601, 607 can be active over the same entity data buffer 901. This means the developer reads an entity instance and can interact with its properties through an instance of a view class. However, the storage underlying the view class instance is not actually in the view class, it is in the entity data buffer.

The need for the full set of properties is important for business logic. Consider writing to properties of an entity view class. At least two issues are presented: the interrelation by business logic of entity view class properties 605, 607 with entity properties that are not on the entity view class, and secondly, activation of business logic that depends upon or changes properties outside of the entity view class. The following example explains these concepts and addresses the business logic issues with respect to the use of property patterns. The business logic issues are also described in related U.S. patent application Ser. No. 10/389,685, filed Mar. 12, 2003 entitled "Parameterized and Reusable Implementations of Business Logic Patterns," the entirety of which is hereby incorporated by reference.

Business applications are designed to handle various business events, such as order fulfillment and shipment. The business applications include application features that are implemented using code. In addition to code, business applications include a number of abstractions to interact with the code when executing the business applications. The Microsoft Business Framework® (MBF), for example, offers a broad range of framework defined abstractions (Entity, Operation, . . . ) to the business developer and a single abstraction (Entity Pattern), that allows the business developer to capture business logic for reusability. With reference to FIGS. 5 and 6, for example, one abstraction is a business entity that models storing data pertaining to a customer or sales order. As shown, these entities 501 (or objects) contain classes 601, 603 for interacting with the data, while the data is stored in a relational database on disk and in an entity data buffer in memory. Business applications contain many different patterns (i.e., property and entity patterns) involving one or more of entities 501.

Figure 8:
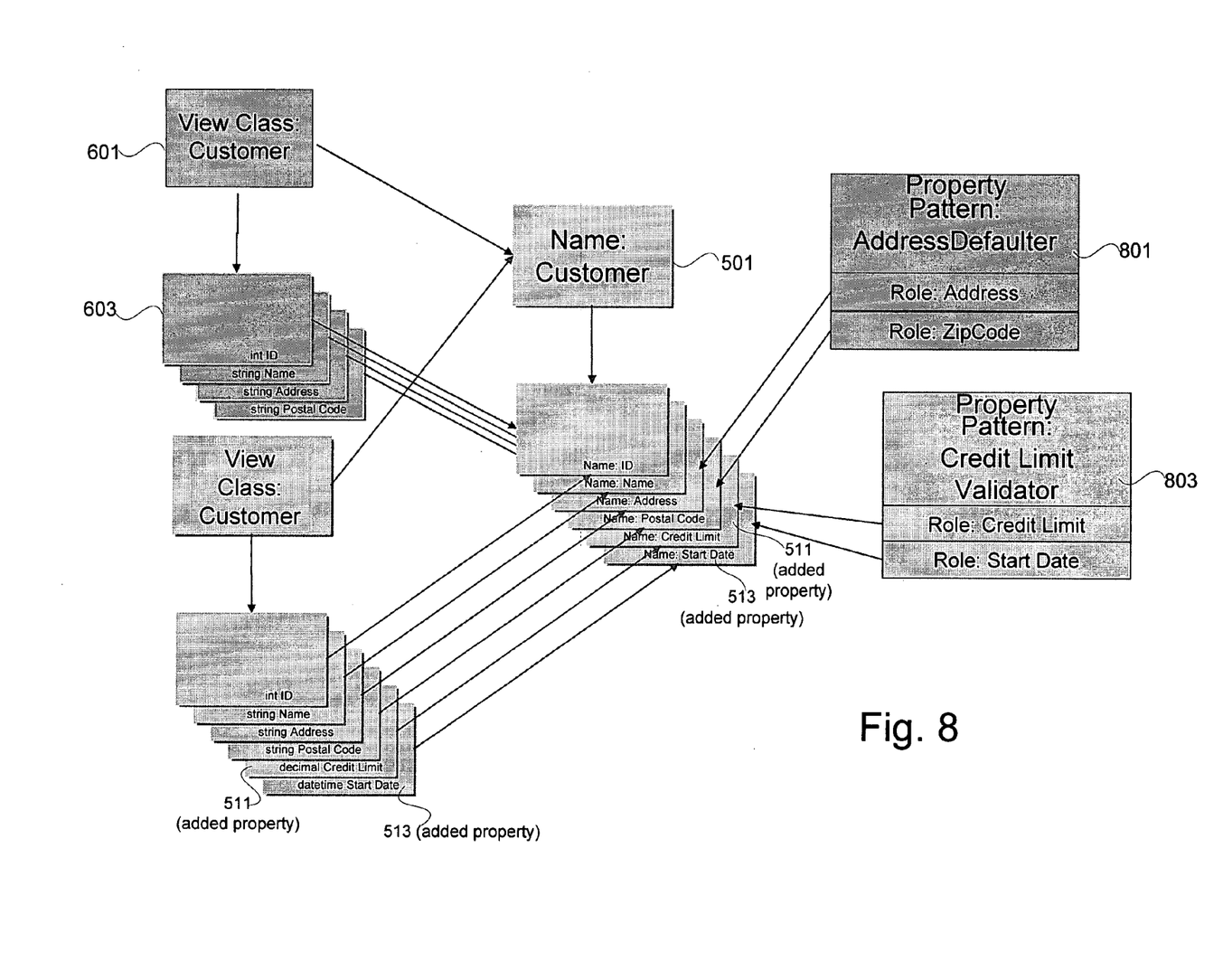
FIG. 8 is a block diagram illustrating example entity view classes over the set of example properties of FIG. 5 along with the use of property patterns against the properties.

Referring next to FIG. 8, shown is a block diagram illustrating example entity view classes over the set of example entity properties of FIG. 5 along with the use of property patterns against the properties. A property pattern is a method that has its input or output arguments bound to specific properties on an entity; it is notified of changes through events, and can also set entity property values. Rather than raising events in response to changes in properties on a CLR class, events are raised when changes are made to properties in the entity data buffer 901 for the Customer entity 501. Since the entity data buffer 901 contains the property values accessed by any entity views, a change to an entity view property 603, 607 results in a change to the entity data buffer 901, which in turn raises an event. As shown, property patterns 801, 803 can bind properties that may not be present on one or more of the entity view classes because they are present in the entity data buffer 901. For example, property pattern Credit Limit Validator 803 has the Credit Limit and Start Date properties, which are not present on the Customer entity view class 601. Also, an optimization is that if the set of property patterns 801, 803 bound to an entity 501 do not interact with a property, and an entity view class 601, 607 does not include the property, then the property value doesn't need to be read into the entity data buffer or written back to disk. For example, if the property patterns 801, 803 in fact did not interact with the property Start Date 513 and the entity view classes 601, 603 did not include it either, then the property value for Start Date 513 would not need to be read or written.

A variation on the entity view class 601, 603 described above would have a single entity view class containing properties 605, 607 from two or more underlying entities 501 that are associated to one another by means of a relationship (with varying cardinalities on the relationship allowed).

Also, inheritance may be used between the different view classes 601, 603 for a single entity 501, which allows a single method to be passed more than one class of view 601, 603 over the same entity 501 by passing the common base class of those views 601, 603. In another embodiment of this invention, conversion methods like implicit and explicit conversions in the CLR may be used to provide a means to pass an entity view class instance (e.g. 603) into a method that takes entity view class (e.g. 601) as an argument.

Figure 9:
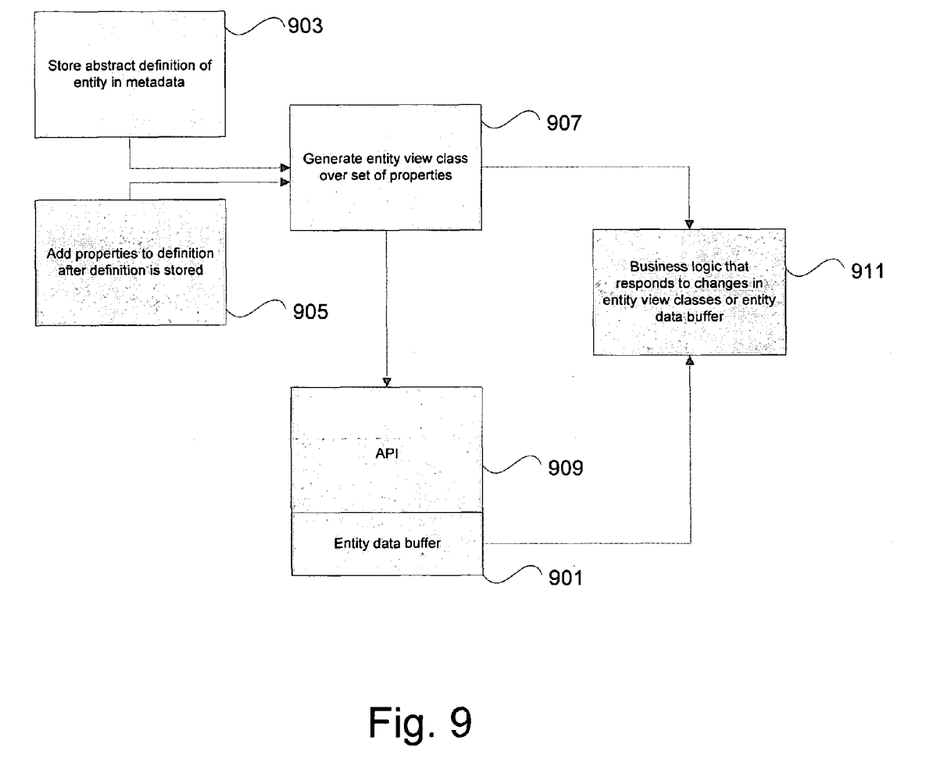
FIG. 9 is a block diagram illustrating an example system providing a programming model for customized data objects.

Referring next to FIG. 9, shown is a block diagram illustrating an example system providing a programming model for customized data objects as described above. An abstract definition of one or more entities is stored in metadata 903 and a query system allows querying in terms of those entities. Properties may be added to that definition after the fact as a packaged unit 905. The entity view class is generated 907 base on a selection of the known properties resulting from items 903, 905 when the entity view class is generated. Entity view classes generated later can include other properties that they are aware of. Note, however, the programming model systems and methods described herein are equally applicable to other software environments and runtime engines such as those provided by Sun Microsystems Java®, etc. An API 909 communicates in terms of the entity view class generated by item 907, which in turn sits on top of the full set of data for the entity (the "entity data buffer" 901). Property patterns are used to add business logic 911 that responds to changes in the entity data buffer 901 that underlies any instances of generated entity view classes 907. Furthermore, some properties are not loaded if no patterns reference them. More generally, if no event registrations are found, patterns are connected up using events.

Lastly, it is important to note the distinction between the use of property patterns and entity patterns. Both are applicable to and may be used in the implementation and application of various aspects of the systems and methods described herein. Entity patterns are an abstraction for a group of properties that allow them to be named differently on the entity than the entity pattern, but allows common logic to refer to them by their entity pattern role name. Property patterns represent patterns between property values and allow responding to data changes. For example, the Total property on the Order is the sum of the Subtotal property on the Order Line, and the Subtotal property on the Order Line is the multiple of its Quantity and Price properties.

In contrast to a property pattern, an entity pattern is a pattern between entire entities. For example, there can be a HeaderLineAccount entity pattern that has three entities in it: Header, Line and Account. Those entities can have relationships between them and even have property patterns on them. The tools allow creating a new instance of that pattern. The effect is to create three entities that are exact copies of the Header, Line and Account entities, including any applied property patterns; the developer renames those entities to fit their scenario and add any additional logic needed. Two examples of the use of the pattern are the SalesOrder, SalesOrderLine and Customer entities, and the PurchaseOrder, PurchaseOrderLine and Vendor entities. Code can be written directly against SalesOrder and PurchaseOrder or it can be written against Header. If code is written against Header, that code can be used against either a SalesOrder or PurchaseOrder. This is similar in function to interfaces or inheritance in programming languages such as VB, C# and C++, but entity patterns can be applied after the fact while inheritance and interfaces requiring changing the SalesOrder, for example.

Entity patterns are applicable to the systems and methods described herein because they can be used with view classes. For example, two entities may have a similar but slightly different set of properties. Some of the properties are completely different, but others may serve the same purpose but have different names. Vendor and Customer are a good example of that, and a Constituent entity pattern could be created to embody the common characteristics of those two entities. Then code can be written against a Constituent but used with either a Customer view class or a Vendor view class.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A machine-implemented method for providing customizable data objects comprising:
    storing, via the machine, an abstract definition of an entity in metadata, the definition including a set of properties of the entity;
    generating a first entity view class based on the set of properties of the entity and including at least one property of the entity in the first entity view class;
    generating a second entity view class based on the set of properties of the entity and including at least one property of the entity in the second entity view class, wherein the first entity view class includes at least one property of the entity that is not included in the second entity view class such that the first and second entity view classes provide different views of and permit interaction with the same entity; and
    when programming against the first or second entity view class, allowing (a) only those properties included in the first or second entity view class, respectively, to be seen and modified, wherein modifying a property results in a modification of the definition of the entity, and (b) switching between the first and second entity view classes for different views of the entity.

2. The method of claim 1 further comprising loading all data associated with the set of properties of the entity when programming against said first or second entity view class.

3. The method of claim 2 wherein properties present in the generated second entity view class include only some of the properties included in the definition of the entity.

4. The method of claim 2 further comprising adding additional properties to an existing entity definition, whether original or previously customized; and
    creating a new entity view class that contains one or more of the additional properties.

5. The method of claim 2 further comprising using event handlers including property patterns to add software capability that responds to changes made to an entity data buffer containing data associated with the set of properties of the entity, the changes having been made through an entity view class, an Application Programming Interface (API), or some other means.

6. The method of claim 5 wherein some properties of the entity are not loaded if no property patterns reference the properties.

7. A computer readable storage medium storing computer executable instructions for performing the steps of:
    storing, via a machine, an abstract definition of an entity in metadata, the definition including a set of properties of the entity;
    generating a first entity view class based on the set of properties of the entity and including at least one property of the entity in the first entity view class;
    generating a second entity view class based on the set of properties of the entity and including at least one property of the entity in the second entity view class, wherein the first entity view class includes at least one property of the entity that is not included in the second entity view class such that the first and second entity view classes provide different views of and permit interaction with the same entity; and
    when programming against the first or second entity view class, allowing (a) only those properties included in the first or second entity view class, respectively, to be seen and modified, wherein modifying a property results in a modification of the definition of the entity, and (b) switching between the first and second entity view classes for different views of the entity.

8. The computer readable storage medium of claim 7 storing computer executable instructions for loading all data associated with the set of properties of the entity when programming against said first or second entity view class.

9. The computer readable storage medium of claim 7, wherein properties present in the generated second entity view class include only some of the properties included in the definition of the entity.

10. The computer readable storage medium of claim 7 storing computer executable instructions for:
    adding additional properties to an existing entity definition, whether original or previously customized; and
    creating a new entity view class that contains one or more of the additional properties.

11. The computer readable storage medium of claim 7 storing computer executable instructions for using event handlers including property patterns to add software capability that responds to changes made to an entity data buffer containing data associated with the set of properties of the entity, the changes having been made through an entity view class, an Application Programming Interface (API), or some other means.

12. The computer readable storage medium of claim 7, wherein some properties of the entity are not loaded if no property patterns reference the properties.

13. A system having at least one computer readable storage medium storing computer executable instructions for providing customizable data objects comprising:
    means for storing an abstract definition of an entity in metadata, the definition including a set of properties of the entity;
    means for generating a first entity view class based on the set of properties of the entity and including at least one property of the entity in the first entity view class;
    means for generating a second entity view class based on the set of properties of the entity and including at least one property of the entity in the second entity view class, wherein the first entity view class includes at least one property of the entity that is not included in the second entity view class such that the first and second entity view classes provide different views of and permit interaction with the same entity; and
    means for when programming against the first or second entity view class, allowing (a) only those properties included in the first or second entity view class, respectively, to be seen and modified, wherein modifying a property results in a modification of the definition of the entity, and (b) switching between the first and second entity view classes for different views of the entity.

14. The system of claim 13 further comprising means for loading all data associated with the set of properties of the entity when programming against said first or second entity view class.

15. The system of claim 14 wherein properties present in the generated second entity view class include only some of the properties included in the definition of the entity.

16. The system of claim 14 further comprising means for adding additional properties to an existing entity definition, whether original or previously customized; and means for creating a new entity view class that contains one or more of the additional properties.

17. The system of claim 14 further comprising means for using event handlers including property patterns to add software capability that responds to changes made to an entity data buffer containing data associated with the set of properties of the entity, the changes having been made through an entity view class, an Application Programming Interface (API), or some other means.

18. The system of claim 17 wherein the means for loading data comprising means for having some properties of the entity not being loaded if no property patterns reference the properties.

19. A system having at least one computer readable storage medium storing computer executable instructions for using customizable data objects comprising:

a first module that communicates with a plurality of entity view classes generated based on a set of properties of an entity, each entity view class including at least one property of the entity, wherein each of the plurality of entity view classes include a property or properties of the entity different from other entity view classes such that the plurality of entity view classes provide different views of and permit interaction with the same entity;

a second module that enables programming against each of the plurality of entity view classes, but allows (a) only those properties included in the respective entity view class to be seen and modified, wherein modifying a property results in a modification of the definition of the entity, and (b) switching between the plurality of entity view classes for different views of the entity; and an entity data buffer containing data associated with the set of properties of the entity upon which the first and second modules rely to obtain data associated with the set of properties of the entity.

20. The system of claim 19 further comprising:

a module that enables using property patterns to add software capability that responds to changes to data in each entity view class or responds to changes to the entity data buffer containing data associated with the set of properties of the entity; and a module for having particular data associated with the set of properties not be loaded if no property patterns reference properties with which the particular data is associated.

* * * * *